United States Patent [19]

Davis

[11] Patent Number: 4,992,920
[45] Date of Patent: Feb. 12, 1991

[54] REGULATED AC POWER SYSTEM ENERGIZED BY VARIABLE SPEED PRIME MOVER

[76] Inventor: Donald E. Davis, 7151 Helsmen Bend, Dallas, Tex. 75230

[21] Appl. No.: 406,720

[22] Filed: Sep. 13, 1989

[51] Int. Cl.$^5$ .......................................... H02M 5/458
[52] U.S. Cl. ........................................ 363/36; 322/32; 363/42
[58] Field of Search ...................... 363/36, 37, 41, 42; 322/1, 28, 32; 307/10.1, 11; 290/40 F

[56] References Cited

U.S. PATENT DOCUMENTS

| | | | |
|---|---|---|---|
| 2,967,252 | 1/1961 | Blake | 307/151 |
| 3,419,783 | 12/1968 | Bingley | 363/10 |
| 3,663,945 | 5/1972 | Hughes et al. | 322/87 |
| 3,916,284 | 10/1975 | Hilgendorf | 363/10 |
| 3,991,354 | 11/1976 | Rosa et al. | 318/231 |
| 4,115,729 | 9/1978 | Young et al. | 363/36 |
| 4,214,198 | 7/1980 | Schneider | 320/15 |
| 4,281,371 | 7/1981 | Baker | 363/10 |
| 4,349,867 | 9/1982 | Otsuka et al. | 363/160 |
| 4,376,250 | 3/1983 | Baker, Jr. et al. | 307/150 |
| 4,447,786 | 5/1984 | Saar et al. | 363/41 |
| 4,520,437 | 5/1985 | Boettcher | 363/41 |
| 4,599,687 | 7/1986 | Smith | 363/37 |
| 4,684,818 | 8/1987 | Carlson | 307/10.1 |
| 4,751,629 | 6/1988 | Shimizu et al. | 363/37 |

FOREIGN PATENT DOCUMENTS 257795 12/1985 Japan ............................... 322/1
147960 7/1987 Japan .

OTHER PUBLICATIONS

O'Keil, "Use a Pulse-Width-Modulated Switcher...", Electronic Design, 8, pp. 110-115, Apr. 12, 1977.

Primary Examiner—William H. Beha, Jr.
Attorney, Agent, or Firm—Dennis T. Griggs

[57] ABSTRACT

A three phase alternator is driven by a variable speed prime mover, and its rectified output is pulse width modulated by a gate controlled H-bridge power switch circuit. Predetermined pairs of power switches are gated on and off according to programmed duration and timing instructions contained in a read only memory. In a first embodiment, a sine wave output is produced by successive pulse trains. The first pulse train has alternating positive and negative constant amplitude pulses, with the widths of positive pulses varying sinusoidally and the widths of negative pulses being constant. The second pulse train has alternating positive and negative pulses of constant amplitude, with the pulse widths of the negative pulse components varying sinusoidally, and the pulse widths of the positive components being constant. The components of the first and second pulse trains have an energy distribution which corresponds to one cycle of a sine wave having a fixed frequency. The pulse width modulated waveform is filtered to produce a smooth, low distortion sine wave output waveform. In a second embodiment, the on and off states, and the duration and timing of the on and off states, are controlled to produce a pseudo sine output power wave having an RMS value of 120 VAC at 60 Hz.

6 Claims, 3 Drawing Sheets

REGULATED AC POWER SYSTEM ENERGIZED BY VARIABLE SPEED PRIME MOVER

FIELD OF THE INVENTION

This invention relates to electrical power systems, and in particular to regulated alternating current power supplies.

BACKGROUND OF THE INVENTION

Applications involving mobile equipment sometime require AC power service. Typical mobile applications include recreational vehicles, emergency vehicles such as rescue trucks, ambulances and fire trucks, service repair trucks and small marine vessels such as power boats and sailing boats. AC power service is normally not available in such situations but may be provided on a limited power basis by connecting an inverter to a storage battery or on board generator.

In a certain class of small marine vessels, for example, a prime mover (for example a diesel engine) drives a DC generator for supplying electrical service to DC power loads such as communications equipment and running lights. The prime mover also drives a variable mechanical load, with the principal mechanical load being the propeller, and including auxiliary mechanical loads such as pumps and the like.

An example of a small marine vessel of the foregoing type is an intermediate size sailboat or power boat which is equipped with a small diesel engine and a DC generator. Boats of that class sometime include living accommodations. In such rigs, it is desirable to provide AC power for operating personal convenience equipment such as air conditioners, television sets, hair dryers and microwave ovens, all of which require constant frequency 60 cycle AC power, which is not provided by the onboard DC generator. AC power service for such personal convenience equipment may sometimes be provided by a public utility at the dock, but is usually not otherwise available. Moreover, it may not be practical to connect an inverter to the onboard battery to produce AC operating power for heavy load requirements.

The prime mover engine may be used for generating AC power. However, a complicating factor in producing constant frequency 60 Hz AC power from a variable speed prime mover is that its RPM output is not constant throughout the various boating operations. Additionally, its RPM fluctuates somewhat as auxiliary mechanical loads are connected and disconnected. One further limiting factor in retrofitting a small marine vessel or land vehicle with AC power capability is the limited amount of space available in the engine compartment. In most instances, there is simply not enough space available to accommodate a constant output speed transmission and a conventional 60 Hz alternator which is capable of producing an adequate level of power (for example 3 KVA) required to operate a variety of personal convenience appliances.

DESCRIPTION OF THE PRIOR ART

Electrical generators convert rotary mechanical energy into electrical energy by rotating an electrical field winding on a rotor with respect to a stator winding, which produces an electrical current flow in the stator winding. Rotational motion may be imparted to the rotor field winding by a variety of mechanical power means, such as a diesel engine, wind turbine or the like.

Electrical generators can be used to generate DC as well as AC current. Within the class of AC current generators, also known as alternators, is the polyphase AC generator, in which the stator is equipped with a polyphase winding, and the rotor is provided with a DC field winding.

The output frequency of the alternator is proportional to the speed of rotation (RPM) of the rotor field winding. For example, a three phase AC alternator may require a rotor speed of 1,800 RPM to generate a 60 Hz AC signal. Most domestic appliances which operate on AC current require constant frequency (60 Hz) for efficient operation. In situations where the prime mover has a variable RPM, power output regulation must be provided by regulation circuitry to produce a constant frequency output. Otherwise, variations in the prime mover RPM will produce corresponding variations in the output voltage amplitude and the output frequency of the generated power.

Regulating circuits are known for controlling the level of direct current excitation applied to the field winding of an AC generator. Such regulators are generally responsive to the time rate of change of the voltage and current at the output of the generator. Although such circuits are generally satisfactory for regulating the amplitude of the power output, there remains interest in providing power control circuits which also regulate the frequency of output power derived from variable RPM prime movers.

In one conventional regulator, constant frequency power is provided by amplitude modulating the output of the generator with a signal having a constant frequency equal to the desired output frequency, and removing the original generator frequency by filtering. In such systems, a substantial portion of the power available at the generator is lost at the output due to the amplitude modulation and filtering.

The following U.S. patents disclose circuits for regulating the output of alternating current generators:

| | |
|---|---|
| 4,349,867 | 3,663,945 |
| 4,281,371 | 3,419,783 |
| 3,991,354 | 2,967,252 |
| 3,916,284 | |

SUMMARY OF THE INVENTION

A three phase alternator is driven by a variable speed prime mover, and its rectified output is pulse width modulated by a gate controlled, power switch bridge circuit. The switching action produces a train of power output pulses, with the pulses in the train having a constant amplitude, but having pulse widths which vary in a sinusoidal relationship and which repeat at a fixed frequency. The pulse width modulated waveform is filtered to produce a smooth, low distortion sine wave output waveform. Additionally, a feedback signal is applied to the field of the alternator to maintain a constant amplitude output to compensate for variations in the rotational speed of the prime mover as well as load changes.

In the preferred embodiment, the regulator includes gate controlled power switches connected in an H-bridge circuit across the rectified output of the alternator. Predetermined pairs of the power switches are gated on and off according to program instructions stored in a read only memory. The program contained in the read only memory selects the on and off states of the power output switches and the duration and timing of those states to produce alternating positive and negative amplitude output pulses of variable width.

In one embodiment, the power switches are gated on and off to produce successive first and second pulse trains. The first train has alternating positive and negative constant amplitude pulses, with the positive pulse widths varying sinusoidally and the negative pulse widths being constant. The second train has alternating positive and negative pulses of constant amplitude, with the negative pulse widths varying sinusoidally and the positive pulse widths being constant. The components of the first and second pulse trains have an energy distribution which corresponds to one cycle of a sine wave having a fixed frequency. The program is implemented under microprocessor control.

In an alternative embodiment, the power switches are gated on and off to produce a pseudo sine wave having a desired RMS value at a fixed frequency.

BRIEF DESCRIPTION OF THE DRAWINGS

A preferred embodiment of the invention will now be described, by way of example, with reference to the accompanying drawings, in which.

DETAILED DESCRIPTION OF THE PREFERRED EMBODIMENT

In the description which follows, like parts are indicated throughout the specification and drawings by the same reference numerals, respectively.

Figures 1, 2:
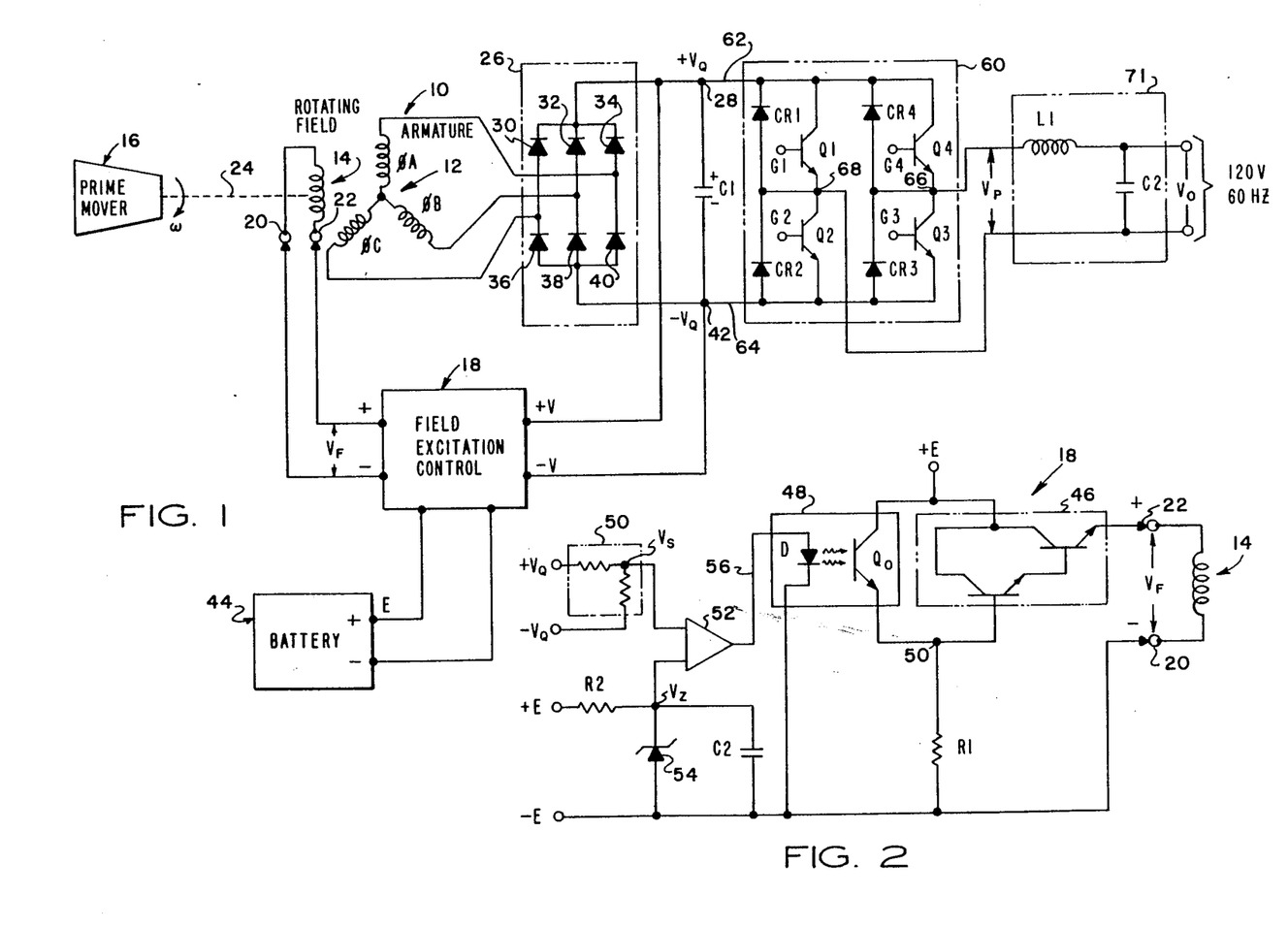
FIG. 1 is a simplified circuit diagram of a controlled frequency power supply system constructed according to the present invention.
FIG. 2 is a simplified circuit diagram of a field excitation control circuit.

Referring now to FIG. 1, an alternator 10 has a three phase stator armature winding 12 and a DC field rotor winding 14. The armature winding has three separate winding phases, indicated by phase coil groups, $\phi A$, $\phi B$ and $\phi C$. The balanced output winding phases $\phi A$, $\phi B$ and $\phi C$ are displaced in space by 120 mechanical degrees, and the corresponding current output phases are separated in phase by 120 electrical degrees. In response to rotation and the application of DC voltage excitation to the field winding 14, three phase alternating currents are induced in the armature winding at a frequency which is proportional to the speed of rotation of a prime mover 16. The prime mover 16 may be, for example, a diesel engine which is mechanically coupled in driving relation to the rotor field winding 14.

The field winding 14 is electrically connected to a field excitation control circuit 18 through slip ring conductors 20, 22. The prime mover 16 is mechanically coupled to the rotor field winding 14 by a shaft 24. As the prime mover 16 turns the shaft 24, the field winding 14 rotates within the stator armature winding 12, and the electrically conductive phase windings cut through the magnetic lines of flux established by the rotating field winding 14 within an annular air gap between the rotor and stator to induce three phase alternating current flow in the armature stator winding phases $\phi A$, $\phi B$ and $\phi C$. The magnitude of the current produced in the armature stator windings is proportional to the strength of the rotor magnetic field and the speed of rotation of the rotor 14.

Variations in the RPM of the prime mover 16 will cause a variation in the output frequency of the generated current which is directly proportional to the rotational speed of the rotating field 14. Although the alternator will continue to produce power at such lower speeds, the frequency of the output current will vary proportionally, and cannot be applied directly to operate frequency sensitive loads. The normal operating speed range of the diesel engine 16 is 1000 RPM to about 4,000 RPM. This is a 4:1 ratio and is in the RPM range over which the frequency of the output voltage $V_o$ should be maintained substantially constant As previously discussed, it is not practical in certain applications to maintain RPM speed regulation of the prime mover, so that it is to be expected that the amplitude of the generated voltage and its frequency will vary in direct proportion to the speed of rotation of the prime mover. In such situations, it is necessary to provide regulation to maintain the amplitude of the generated voltage constant, independent of RPM variations, and also to transform or otherwise convert the variable frequency output to a constant frequency.

Referring now to FIGS. 1 and 2, amplitude regulation of the rectified output voltage $V_Q$ is provided by the field excitation control circuit 18. The three phase output of the armature 12 is rectified by a three phase bridge rectifier assembly 26, thereby producing a positive voltage $+V_Q$ at output terminal 28. Positive half cycle current flow is conducted through diodes 30, 32 and 34 to positive output terminal 28. Negative half cycle current flow is conducted through diodes 36, 38 and 40 to negative output terminal 42.

Variations of prime mover RPM will cause corresponding variations in the amplitude of the generated voltage $+V_Q$. The output voltage $+V_Q$ is regulated to 180 volts by the field excitation control circuit 18, as illustrated in detail in FIG. 2. Field excitation current is delivered from a storage battery 44 which has a terminal voltage E, for example 12 VDC or 24 VDC.

The rectified output voltage signal $+V_Q$ is smoothed by polarized capacitor C1 which is connected across the positive output terminal 28 and the negative output terminal 42. In the preferred embodiment, the alternator components are selected to yield a peak output voltage $+V_Q=180$ VDC across the output of the three phase bridge rectifier 26 at the minimum expected operating RPM. That is, once the field battery potential E has been selected, the field winding 14 and the balanced output phase windings $\phi A$, $\phi B$ and $\phi C$ are wound with an appropriate number of winding turns, respectively, so that the rectified peak output amplitude of each phase is 180 VDC at 1,000 RPM.

According to this arrangement, it is possible to control the output voltage to 135-145 VAC, line to line. Moreover, the 180 VDC when switched by an H-bridge controller, produces a pseudo sine wave whose RMS value is 120 VAC. Accordingly, by carefully selecting the alternator components, the correct output voltage is produced without additional control circuitry. Moreover, no transformers are required for isolation or voltage adjustment, since DC electrical isolation is provided by the alternator 10 itself. This simplifies the control circuitry while reducing the volume and weight of the auxiliary AC power system.

Referring now to FIG. 2, field excitation voltage $V_F$ is applied across the field winding 14 by a series Darlington regulator 46. In this arrangement, the collector of the Darlington regulator 46 is connected to the positive terminal $+E$ of the storage battery 44, its emitter is connected to the positive slip ring 22, and its base is connected to a current limiting resistor R1. Current drive through the series Darlington regulator 46 is controlled by varying the current flow through the base resistor R1 of the series Darlington regulator 46.

According to the preferred embodiment, base drive current variation in the Darlington regulator 46 is controlled by an opto-isolator 48. In this arrangement, the collector of the opto-isolator transistor $Q_o$ is connected to the battery 44, and its emitter output is connected to the base input node 50 of the Darlington regulator 46. Current flow through the opto-isolator 48, and through the base current drive resistor R1, is directly proportional to the light output intensity of the light-emitting diode D of the opto-isolator 48.

The amplitude of the generated output voltage $+V_Q$ is scaled by a resistance divider 50, with the scaled voltage signal $V_s$ being applied as one input to a difference amplifier 52. A reference voltage $V_z$ is also input to the difference amplifier 52. The reference voltage $V_z$ is developed by a Zener diode 54 which is reversed biased by the battery potential $+E$ applied across a current limiting resistor R2. The voltage dropped across zener diode 54 is stabilized by capacitor C2.

The reference voltage $V_z$ is selected to be a predetermined offset value with respect to the magnitude of the scaled voltage signal $V_s$ at a predetermined minimum RPM (e.g., 1,000 RPM) at the lower limit of prime mover RPM operating range. According to this arrangement, the difference amplifier 52 produces a difference voltage signal 56 which is applied to the diode input of the optical isolator 48. The magnitude of the difference voltage signal 56 is maximum at the low range RPM value and is minimum at the high range RPM value. The application of the difference signal 56 to the light-emitting diode element of the opto-isolator 48 produces a predetermined current drive signal through the base resistor R1 and the base of the Darlington regulator 46, with the result that the appropriate level of current flow is conducted through the field winding 14 to maintain a rectified output voltage of $V_Q = +180$ volts DC at the output terminal 28.

As the prime mover RPM rotational speed rises from the minimum RPM value, $V_s$ increases, and the amplitude of the difference signal 56 decreases, thereby decreasing the level of base current flow through the Darlington regulator 46. Accordingly, as the RPM of the prime mover increases, $V_s$ increases, and the difference $(V_z-V_s)$ grows smaller. Consequently, the current drive through the base of the Darlington regulator is reduced, with the result that reduced current flow is conducted through the rotor field winding 14. This in turn reduces the magnetic flux density to offset the effect of increased prime mover RPM. Accordingly, the rectified output voltage $+V_Q$ is well regulated, and is substantially independent of variations in prime mover RPM over the expected operating range.

The amplitude regulated output voltage $+V_Q$ remains essentially constant at a predetermined amplitude level, for example 180 volts DC, although the RPM of the prime mover may vary across the RPM range corresponding with different operating modes. The amplitude regulated DC output voltage $+V_Q$ is converted to a fixed frequency alternating current output signal $V_P$ as shown in FIG. 4, by pulse width modulation of the DC output voltage $V_Q$. In the preferred embodiment, pulse width modulation is accomplished by an array of gate controlled power switches Q1, Q2, Q3 and Q4 which are connected in an H bridge network 60 as shown in FIG. 1 and in FIG. 3. The input terminals 62, 64 of the H bridge network 60 are connected across the regulated DC output terminals 28, 42.

Figure 3:
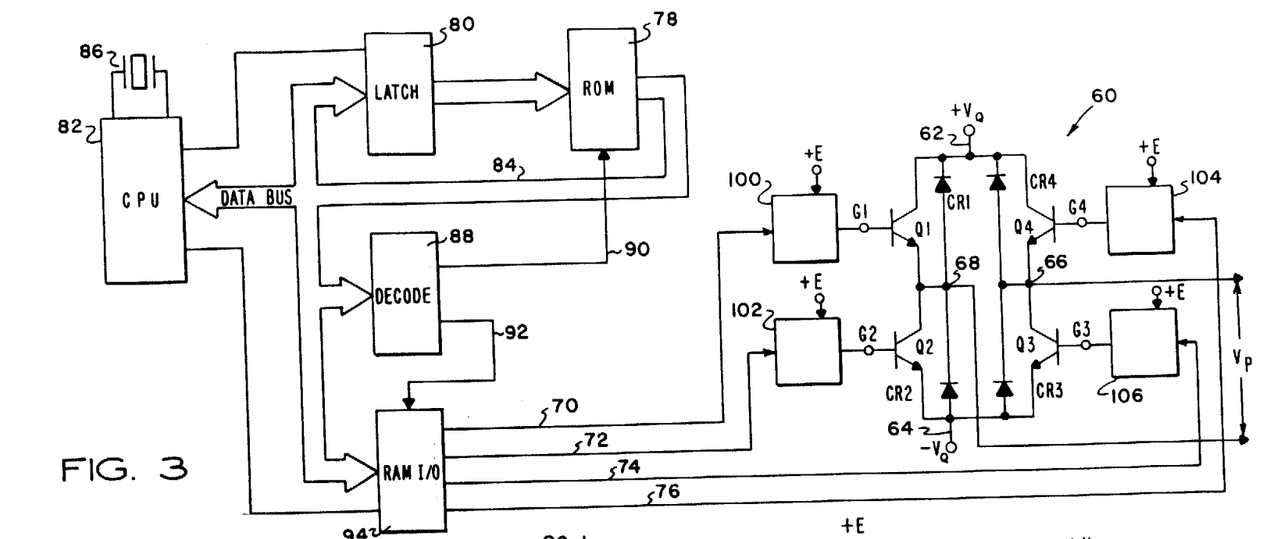
FIG. 3 is a simplified block diagram which illustrates microprocessor control of the power switching circuit of FIG. 1.
Figure 4:
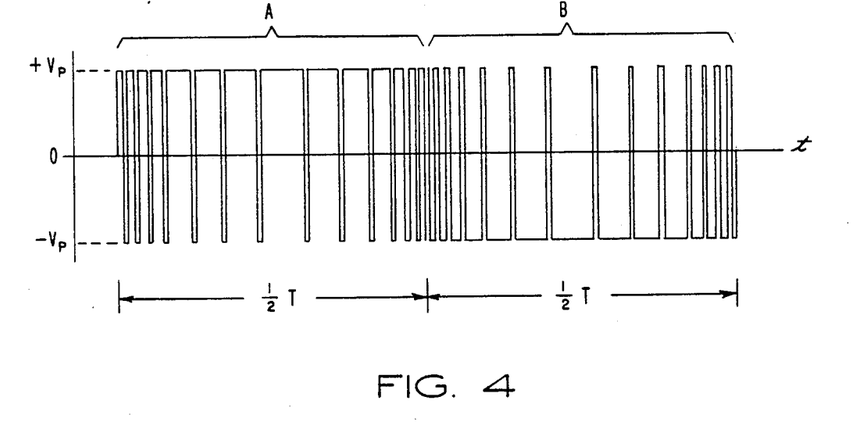
FIG. 4 is a pulse width modulated voltage waveform which is generated by the circuit shown in FIG. 3.

Referring to FIG. 1, FIG. 3 and FIG. 4, the power switches Q1, Q2, Q3 and Q4 are switched on and off in pairs. Q2 and Q4 are switched on simultaneously so that a positive current pulse is conducted through power switch Q4 through output terminal 66 with the positive current pulse being returned through output terminal 68 and power switch Q2. Power switches Q2 and Q4 are then turned off, while power switches Q1 and Q3 are turned on so that a negative current pulse is conducted through power switch Q3 to power output terminal 66, with the negative current pulse being returned through power output terminal 68 and power switch Q1.

According to one embodiment of the invention, the widths of the successive positive and negative power pulses are varied according to a sinusoidal relationship. As can be seen in FIG. 4, the duration of the positive pulses in pulse train A varies sinusoidally for one-half cycle, with the negative pulses remaining substantially constant, while during the second half of the cycle, the pulse width of the negative power pulses in pulse train B varies sinusoidally, and the pulse width of the positive current pulses remains constant. Pulse train A has a duration of $\frac{1}{2}T$, and pulse train B has a duration of $\frac{1}{2}T$. The total duration of the successive pulse trains A, B is T seconds, with a frequency $F=1/T=60$ Hz in the preferred embodiment.

Figure 5:
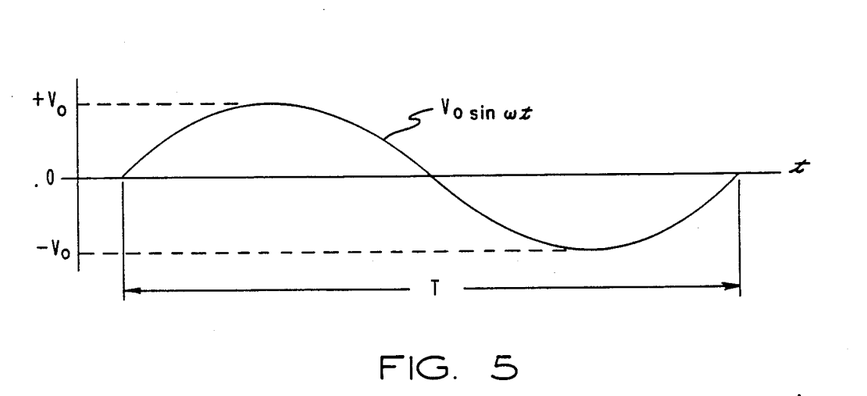
FIG. 5 is a power output voltage waveform obtained by filtering the waveform shown in FIG. 4; and, FIG. 6 is a regulated square wave voltage output waveform produced by the circuit of FIG. 3, with the duty cycle of the square wave being controlled so that the waveform approximates a sine wave (i.e. contains no third harmonic or multiple of third harmonic).

Referring again to FIG. 1, a low pass filter 71 is connected across the power output terminal 66, 68. The purpose of the low pass filter 71 is to smooth the power pulse trains A, B to yield a sine wave output signal $V_o$ as shown in FIG. 5. The frequency of the sine wave is $F=1/T=60$ Hz, with the output sine wave having an RMS amplitude of 120 volts AC.

Because the load to which the output voltage $V_o$ is attached may be inductive, diodes CR1, CR2, CR3 and CR4 are coupled across the respective power switches Q1, Q2, Q3 and Q4 to provide a return path for circulating reactive energy trapped in the inductive load during intervals of non-conduction of the pairs of power switches Q2, Q3 and Q1, Q4. The diodes discharge reactive energy reflected back from the load to prevent interference with operation of the power switches.

Figure 6:
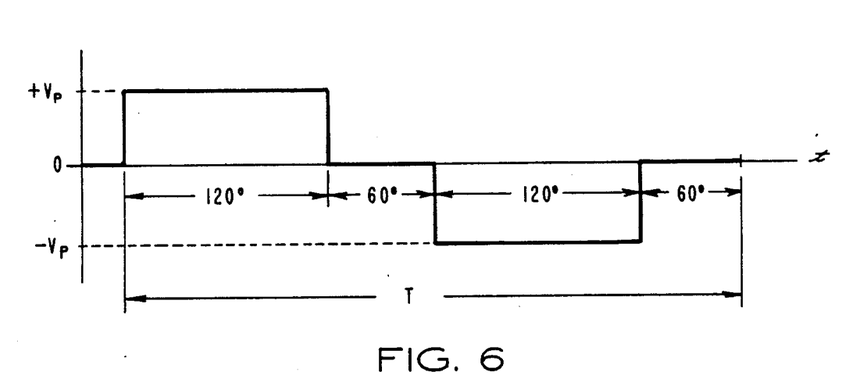

Referring now to FIG. 3, gate signals 70, 72, 74 and 76 are applied as driving signals to power switches Q1, Q2, Q3 and Q4, respectively, to cause the power switches to turn on and off according to programmed instructions contained within a read only memory (ROM) 78. The program within the read only memory 78 provides the selection of the on and off states of the power output switches, and the timing of those states. According to a first operating program, the positive dominant pulses of pulse train A and the negative dominant pulses of pulse train B are produced as shown in FIG. 4. According to a second operating program, the pseudo sine waveform of FIG. 6 is produced by the same circuitry.

The first operating program includes the variables and program instructions required to generate the sinusoidal varying pulse widths of positive pulses in train A and negative pulses in train B, including the algorithm for repeating the pulse trains A, B in a sequence of period T, and at a frequency $F=1/T=60$ Hz. The second operating program includes the variables and program instructions required to generate the pseudo sine wave of FIG. 6 in which the first half cycle includes a square wave having a pulse duration of 120 degrees, followed by a 60 degree non-conducting state, with the second half cycle being characterized by a negative amplitude square wave having a pulse duration of 120 degrees, followed by a non-conducting state of 60 degrees. The duty cycle of the positive and negative amplitude components of the pseudo sine wave are controlled so that the waveform approximates a sine wave in the sense that it contains no third harmonic or multiple of third harmonics. The third harmonic is the dominant component which produces heating effects and losses in induction motors.

An 8-bit latch 80 is coupled to the ROM 78 and a central processing unit (CPU) 82 by a data bus 84. The program instructions are read from the read only memory 78 by the CPU 82 according to address signals which are communicated by the data bus 84. The CPU 82 has a 6.144 MHz crystal 86 which provides a system clock frequency of 3.072 MHz. The gate driving signals 70, 72, 74 and 76 are accurately timed from the system clock.

The CPU 82 is an 8-bit microprocessor which communicates with the ROM 78 and latch 80 by the data bus 84 which has 16 address bits. The upper 8 bits are dedicated data bits, and the lower 8 bits are multiplexed for either address or data.

The read only memory 78 is structured from address 0000 up through IFFF hex code, which provides 4,096 memory address locations. The addresses are input to a decoder 88 which generates a ROM enable signal 90 or a RAM enable signal 92, depending on the particular address received from the CPU 82. That is, for hex addresses up to IFFF, a ROM enable signal 90 is applied to the ROM 78 which permits data stored at the address in the ROM 78 to be transferred and stored in a random access memory RAM 94. The next memory address which can be decoded is 2000. Accordingly, any address in the hex range 2000 through 2FFF, will be directed to the RAM 94.

Thus, the program stored in the read only memory 78 is selectively read and implemented within the CPU 82, with the results of some operations being communicated to the RAM 94 through the data bus 84, and as enabled by the decoder 88.

One or more sets of operating programs are stored in the ROM 78, including at least a first operating program for controlling the execution of instructions issued from the central processing unit 82. The read only memory 78 thus includes program instructions as well as stored data. The CPU 82 includes an arithmetic and logic unit and a main control logic unit. The principal functional sections communicate with each other through signals that represent data, instructions and control signals during the execution of a data processing program stored within the ROM 78. The order, timing and direction in which this information flows is effected by the CPU 82. The CPU 82 is in turn directed by a sequence of program instructions which are stored in the ROM 78.

Referring again to FIGS. 3 and 4, the average amount of power conducted by the positive and negative current pulses in the pulse trains A, B is proportional to the width of the constant amplitude pulses The positive pulse components within pulse train A have widths which vary according to one-half cycle of a sine wave, while the pulse widths of the negative components of pulse train A remain constant. Thus the total average power delivered by the pulse components of pulse train A is proportional to the power generated by the positive half cycle of a sine wave having a period T, as shown in FIG. 5. Likewise, the negative current components in pulse train B have widths which vary in proportion to the negative half cycle of the sine wave shown in FIG. 5. Consequently, by applying the alternating positive and negative pulses of pulse trains A, B to the input of the low pass filter 71, an integrating effect is produced which yields the smoothly varying sine wave signal $V_o$ as shown in FIG. 5. The program stored within the ROM 78 causes the pulse trains A, B to repeat in succession as shown in FIG. 4, and when filtered by the low pass filter 71, yields a time varying function $V(t)=V_o \sin \omega t$, where $\omega=2\pi F$, and $F=1/T$.

It will be understood that the frequency of the output power sine wave can be changed by selecting the value of T within the ROM program, so that the power output frequency can be 50 Hz, 60 Hz or 400 Hz, as desired.

Many AC loads, for example induction motors, do not require a smooth sine wave power input signal. For such applications, an operating program can be stored in the ROM 78 to generate a pseudo-square wave output as shown in FIG. 6, where the frequency is $F=1/T=60$ Hz, but with the duty cycle of the positive and negative components of the square wave being controlled to eliminate the third and multiples of third harmonics. In such applications, the low pass output filter 71 is not required.

Figure 3A:
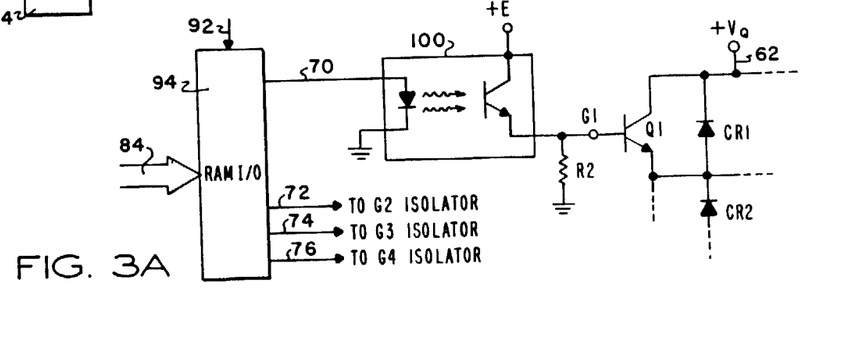
FIG. 3A is a circuit diagram which illustrates power switch isolation.

Referring now to FIG. 3 and FIG. 3A, the drive signals 70, 72, 74 and 76 are coupled to the power switch gates G1, G2, G3 and G4, respectively, through opto-isolators 100, 102, 104 and 106. Referring to FIG. 3A, upon conduction of a logic 1 output signal on gate drive 70, the light-emitting diode component of the opto-isolator 100 illuminates, thereby producing conduction through the optically responsive collector-to-emitter junction, with the result that current flows through a base resistor R2. This produces drive current through terminal G1, which causes power switch Q1 to turn on. By this arrangement, the output power switches are isolated with respect to each other, and with respect to the output ports of RAM 94.

The opto-isolators 100, 102, 104 and 106 provide base drive for the power output switches, and also provide reverse base-emitter bias voltage to enhance the output stage switching time and to provide for reduced collector leakage currents. The opto-isolators used in the preferred embodiment provide approximately three amps of base drive for each of the power output switches Q1, Q2, Q3 and Q4.

From the foregoing description, it will be seen that the power regulation circuit supplies constant frequency AC power although the prime mover may be operating at varying speeds. Since the output switching circuit is driven by a microprocessor, the waveform and the output frequency can be easily modified by a program change within a programmable read only memory. The regulation circuit allows the same basic power system to deliver electrical power by square waves, sine waves, pseudo sine waves and other waveforms, as desired.

Although the invention has been described with reference to a preferred method and circuit, and with reference to a specific prime mover application, the foregoing description is not intended to be construed in a limiting sense. Various modifications of the disclosed method and apparatus as well as alternative applications of the invention will be suggested to persons skilled in the art. It is therefore contemplated that the appended claims will cover any such modifications or embodiments that fall within the true scope of the invention.

What is claimed is:

1. A system for supplying controlled frequency power at a predetermined RMS value and predetermined fixed frequency derived from a prime mover having an operating RPM which is variable over a range from a minimum RPM to a maximum RPM comprising:
    an alternator having a rotor field winding adapted for mechanical coupling to said prime mover, and having a stator armature winding inductively coupled to said field winding for producing alternating current in response to rotation of said field winding, said field winding and armature winding being adapted to produce an alternating output voltage on said armature winding which has an RMS value substantially equal to said predetermined RMS value when the prime mover is operating at the minimum RPM;
    a rectifier circuit connected to said armature winding for converting an alternating current input signal to a direct current output signal;
    a field excitation control circuit having an input terminal connected to receive said rectified DC output signal and having an output terminal connected to said field winding for controlling the amplitude of field excitation applied to said rotor field winding;
    a switching circuit having an input terminal connected to the output of said rectifier circuit for producing alternating positive and negative amplitude power output pulses; and,
    a control logic circuit coupled to said switching circuit for controlling the timing and width of each positive and negative power output pulse, respectively.

2. A system for supplying controlled frequency power as defined in claim 1, wherein said switching circuit comprises first and second pairs of power switches connected in an H-bridge circuit across the output of said rectifier, with predetermined pairs of the power switches being gatable on and off for producing first and second power output pulses of alternating polarity and predetermined width.

3. A system for supplying controlled frequency power as defined in claim 1, said switching circuit comprising a plurality of pairs of gate controlled power switches, and said control logic circuit being coupled to the gates of said gate controlled power switches, said control logic circuit including a central processing unit and a read only memory having a set of program instructions which are addressable and readable by the central processing unit for controlling the on and off states of the power output switches and the timing of those states for producing positive and negative pulses during predetermined intervals and for repeating said positive and negative pulses at a predetermined frequency.

4. A system for supplying controlled frequency power as defined in claim 1, wherein said switching circuit includes gate controllable power switches coupled to said control logic circuit for producing first and second trains of output pulses of variable width, the first pulse train having alternating positive and negative amplitude pulses, with the width of each positive pulse varying sinusoidally and the width of each negative pulse being constant, and the second pulse train having alternating positive and negative amplitude pulses, with the width of each negative pulse varying sinusoidally and the width of each positive pulse being constant.

5. A method for supplying controlled frequency power at a predetermined RMS value and predetermined fixed frequency from a prime mover having an operating RPM which is variable over a range from a minimum RPM to a maximum RPM comprising the steps:
    rotating the rotor field winding of an alternator by said prime mover at an operating RPM;
    generating an alternating output voltage on the armature winding of the alternator which has an RMS value equal to the predetermined RMS value when the prime mover is operating at said minimum RPM;
    converting the alternating output voltage produced by said armature winding to a DC output voltage;
    exciting said field winding with a current signal which is inversely proportional to the amplitude of said DC output voltage;
    switching the DC output voltage to produce alternating positive and negative amplitude power output pulses; and,
    controlling the timing and width of each positive and negative power output pulse, respectively.

6. A method for supplying controlled frequency power from a variable RPM prime mover as defined in claim 5, wherein said switching step is adapted to produce first and second trains of output pulses of variable width, the first pulse train having alternating positive and negative amplitude pulses, with the widths of positive pulses varying sinusoidally and the widths of negative pulses being constant in the first pulse train, and the second pulse train having alternating positive and negative amplitude pulses, with the widths of the negative pulses varying sinusoidally and the widths of positive pulses being constant in the second pulse train.

* * * * *

UNITED STATES PATENT AND TRADEMARK OFFICE
CERTIFICATE OF CORRECTION

PATENT NO. : 4,992,920

DATED : 02/12/91

INVENTOR(S) : Donald E. Davis

It is certified that error appears in the above-identified patent and that said Letters Patent is hereby corrected as shown below:

Column 1, line 11, "sometime" should be -- sometimes --.

Column 4, line 24, "constant" should be -- constant. --.

Column 8, line 9, "pulses The" should be -- pulses. The --.

Signed and Sealed this

Thirtieth Day of June, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,992,920

DATED : February 12, 1991

INVENTOR(S) : Donald E. Davis

It is certified that error appears in the above-identified patent and that said Letters Patent is hereby corrected as shown below:

Sheet 2 of 3 should be deleted and substitute therefor the attached sheet of drawings consisting of Figs. 3 and 3A, as shown on the attached page.

Signed and Sealed this

Twenty-second Day of December, 1992

Attest:

DOUGLAS B. COMER

*Attesting Officer*  *Acting Commissioner of Patents and Trademarks*